United States Patent [19]

Birger

[11] Patent Number: 4,977,535

[45] Date of Patent: Dec. 11, 1990

[54] METHOD OF COMPUTATION OF NORMALIZED NUMBERS

[75] Inventor: Ari Birger, Haifa, Israel

[73] Assignee: Motorola, Inc., Schaumburg, Ill.

[21] Appl. No.: 447,768

[22] Filed: Dec. 8, 1989

[51] Int. Cl.[5] .............................................. G06F 7/38
[52] U.S. Cl. ..................................... 364/748; 364/745
[58] Field of Search .................... 364/748, 745, 715.04

[56] References Cited

U.S. PATENT DOCUMENTS

| 4,528,640 | 7/1985 | Criswell | 364/748 X |
| 4,562,553 | 12/1985 | Mattedi et al. | 364/745 |
| 4,719,589 | 1/1988 | Tanaka | 364/748 |
| 4,796,217 | 1/1989 | Takahashi et al. | 364/745 |

OTHER PUBLICATIONS

"64 Bit Monolithic Floating Point Processors", Frederick A. Ware, et al., IEEE Journal of Solid-State Circuits, vol. SC-17, No. 5, Oct., 1982, pp. 898-907.

*Primary Examiner*—Dale M. Shaw
*Assistant Examiner*—Tan V. Mai
*Attorney, Agent, or Firm*—Robert L. King

[57] ABSTRACT

Floating point numbers are processed by an apparatus, where an increment step may be necessary on a number but where that number may or may not have to be normalized, depending on the computation. The invention is particularly useful in rounding after multiplying, as well as in exponent incrementing after adding. The apparatus also detects a uniform bit state in a number, e.g. detecting all zeroes, such as for overflow detection in a floating point multiplier. A first number and a second number comprising the first number incremented by one or two are computed substantially simultaneously. In one use, one of the first and second numbers is selected in accordance with the outcome of a further predetermined computation. In another use, the most significant bits of the numbers are compared and it is determined that all the bits of the first number are equal if, and only if, the most significant bits are unequal.

7 Claims, 3 Drawing Sheets

METHOD OF COMPUTATION OF NORMALIZED NUMBERS

BACKGROUND OF THE INVENTION

This invention relates generally to computation by data processors of floating point numbers, and more particularly, to data processors which compute normalized numbers.

SUMMARY OF THE PRIOR ART

A prior art floating point multiplier is shown in FIG. 1 and comprises an array 10 of adders such as adder 11 (e.g. 32 in total). These adders are commonly known as a multiplier array which, in this case, multiply two normalized mantissas. Further adders (not shown) are used to add the exponents, but need not be considered in detail here. The result of a most significant adder 13 of the array 10 is passed to a fast adder 14, where the sum bits are added with all the carry bits from the array. This product is normalized, if it is not itself already normalized, in a normalizer 15. As shown in FIG. 1, there are two paths which the calculation may take from this point. The time critical path is through an incrementor 16 which increments the result of the normalizer 15. This incrementor is used in the rounding process. Various rounding processes will be described below. If the particular rounding process does not require incrementing, the calculation proceeds along the path through rounding analysis logic 17. Selector 18 determines which of the results of incrementor 16 and rounding analysis logic 17 is selected and outputted according to the rounding process used.

FIG. 2 shows the approximate time path analysis of the process. From time T0, there is a relatively long delay during the array calculation to T1. The fast adder 14 requires a relatively short time to T2. The normalizing step of normalizer 15 is negligible in time and the incrementing step of incrementor 16 is relatively long between times T2 and T3. Regardless of whether the path proceeds through incrementor 16 or rounding analysis logic 17, the same total time must be provided, so that the result is always presented at the output at the same time.

In integer multiplication, it is necessary, after performing the multiplication in an array, to search for and detect an overflow. This represents an additional step in the calculation which would be desirable to either speed up or eliminate.

SUMMARY OF THE INVENTION

It is an object of this invention to provide an improved apparatus and method of use for the computation of normalized numbers.

In accordance with a first aspect of the present invention, there is provided apparatus for the computation of floating point numbers which: substantially simultaneously computes a first number and a second number which equals the first number incremented by two; performs a further predetermined computation; and selects one of said first and second numbers in accordance with the outcome of the further predetermined computation.

In accordance with a preferred embodiment of the first aspect of the invention, the first number is the mantissa of a floating point number which is the multiplication product of two floating point operands and the further computation comprises a computation to decide whether the first number requires normalizing.

By virtue of the invention, the need to perform an increment subsequent to a fast addition step is dispensed with. Instead, a parallel path is created in which a second number is generated simultaneously and in parallel with the carry-plus-sum number created in fast adder 14 of FIG. 1. The new number created is the same as that number but increased by two. Selector logic then selects which of these numbers to use. The invention will be described in greater detail below. The critical path time diagram for the invention is shown in FIG. 3. As before, the array requires time T1 to perform its computation. Between times T1 and T2, the simultaneous paths of the present invention (to be described below) operate. The final selection step is very small, between times T2 and T3.

In accordance with a second aspect of the invention, there is provided a method of using the data processor to compute normalized numbers comprising the steps of:

substantially simultaneously computing a first number and a second number differing from the first number by one;

comparing the most significant bits of the numbers, and determining that all the bits of the first number are equal if and only if said most significant bits of the two numbers are unequal.

The invention in its second aspect provides a test for detecting all "zeroes" or all "ones", in a manner which is faster than has heretofore been available. If the test is to determine an all "ones" state, the second number must be equal to the first number incremented by one and if the test is to determine an all "zeroes" state, the second number must be equal to the first number decremented by one. The test is useful for detecting an overflow condition in an integer multiplier.

DETAILED DESCRIPTION OF A PREFERRED EMBODIMENT

Figure 1:
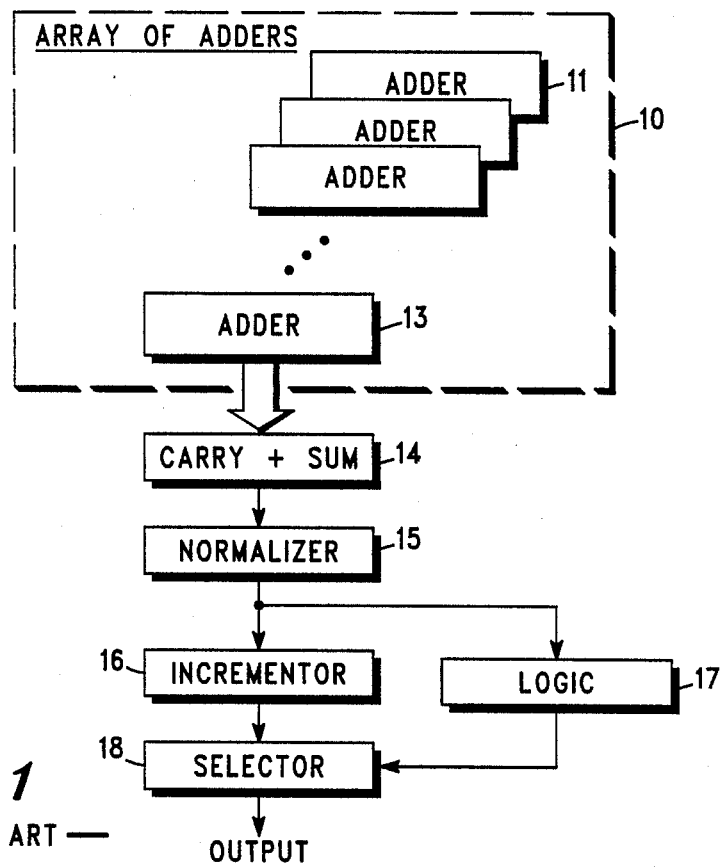
FIG. 1 shows a floating point adder in accordance with the prior art.
Figure 2:
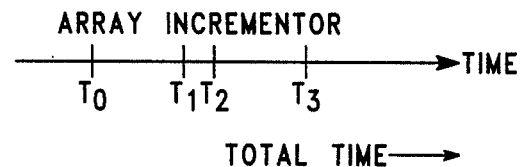
FIG. 2 shows the critical time path for the adder of FIG. 1.
Figure 3:
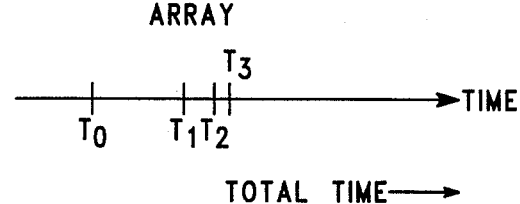
FIG. 3 shows the critical time path for a floating point adder in accordance with the invention.
Figure 4:
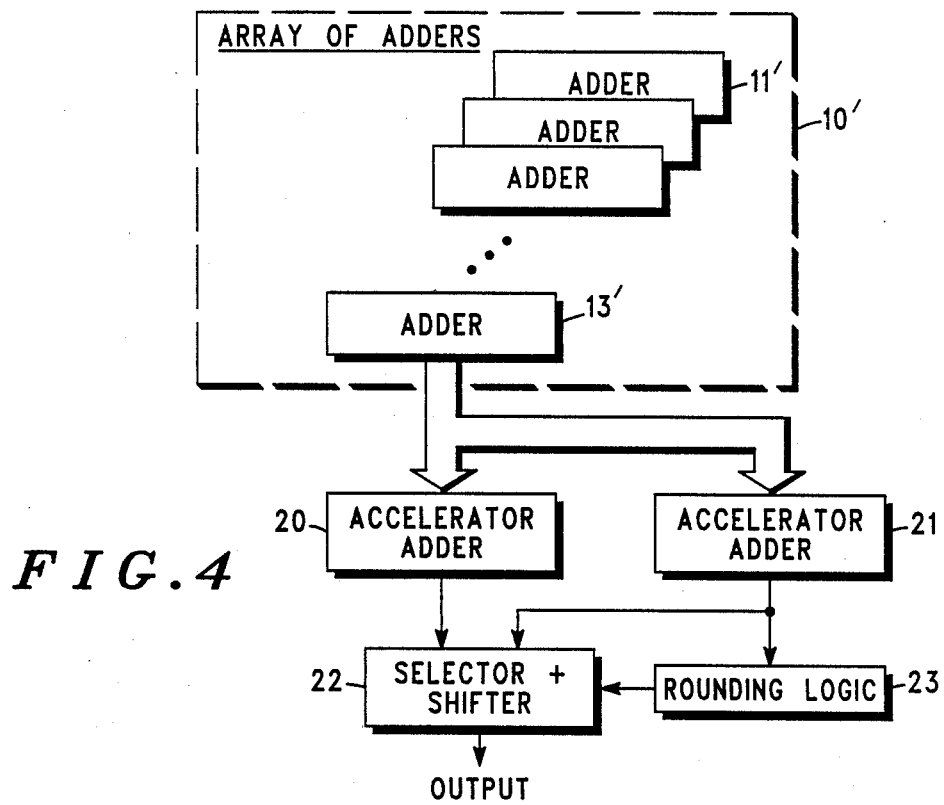
FIG. 4 shows a floating point adder in accordance with a preferred embodiment of the invention.

Referring to FIG. 4, elements 10', 11' and 13' are analogous to the corresponding elements 10, 11 and 13 shown in FIG. 1. In addition to the fast adder 14 of FIG. 1, which is shown as an accelerator adder 20 in FIG. 4, an additional, parallel accelerator adder 21 is provided. This accelerator adder 21 calculates the sum of the carry word, the sum word and 00 . . . 0010. The results of accelerator adders 20 and 21 can be calculated simultaneously. Selector and shifter logic 22 is provided to determine which of the results from accelerator adders 20 and 21 is to be selected for the output. This determination is dependent on: (a) whether the result of accelerator adder 20 is normalized or requires normalizing, (b) the type of rounding to be used, and (c) the results of the lower order bits derived from array 10' which may or may not require rounding.

The standard for normalized numbers is described in the P754 IEEE Binary Floating Point Arithmetic Standard.

Four types of rounding are commonly used. These are as follows.

1. Truncation—in decimal terms, 4.9 is rounded to 4.
2. Rounding to plus infinity—in decimal terms +4.9 becomes 5 and −4.9 becomes (−4).
3. Rounding to minus infinity—in decimal terms +4.9 becomes 4 and −4.9 becomes −5.
4. Rounding to nearest even—in decimal terms ±4.9 becomes ±5, ±4.5 becomes ±4 and ±5.5 becomes ±6.

The truncation type of rounding is also known as "round towards 0".

If the "round towards 0" type of rounding is used, the new accelerator adder 21 introduced by the present invention is not necessary and the output of accelerator adder 20 is simply normalized, if necessary, in shifter 22 and outputted (or outputted directly if the result is already normalized).

Figure 5:
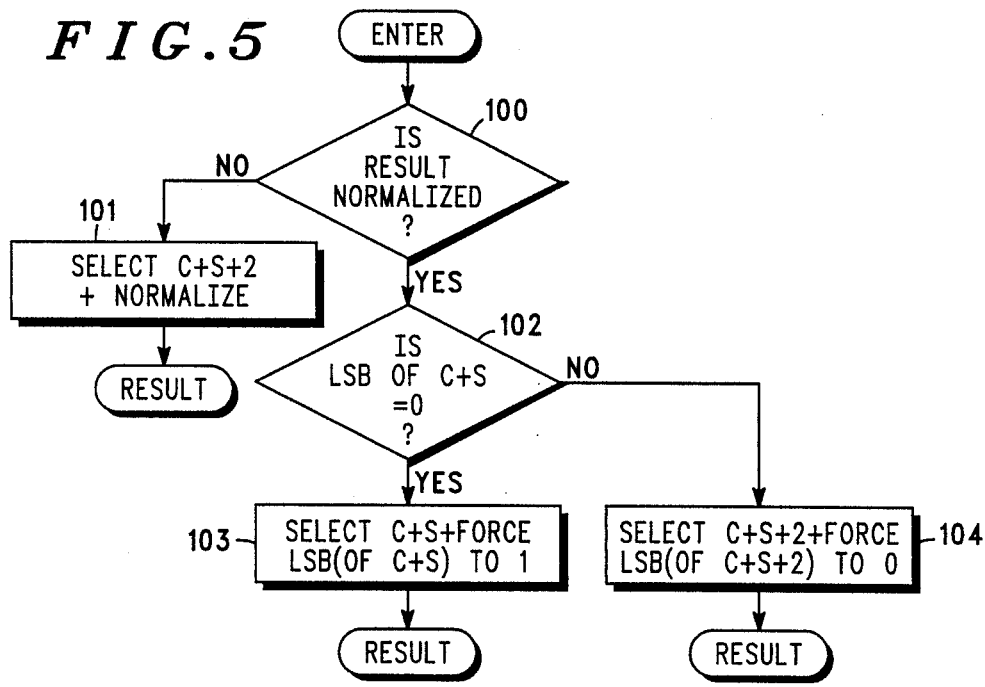
FIG. 5 is a flow chart describing a part of the operation of the adder of FIG. 4.

If the result of the multiplication is positive and "rounding to plus infinity" is used (or the result is negative and "rounding to minus infinity" is used) then the following further rounding steps are made. If all the least significant bits from the array are zero, then the result is simply chopped (i.e. truncated). If, on the other hand, at least one of these less significant bits is one, then a rounding decision is necessary and the procedure of FIG. 5 is executed.

If the result of accelerator adder 20 is not already normalized (step 100), then the contents of accelerator adder 21 are selected in step 101 and are normalized (by shifting) to provide the result. If the aforesaid result is already a normalized number, then the least significant bit of accelerator adder 20 determines the next procedure (step 102). If this bit is zero, then the contents of accelerator adder 20 are selected and the least significant bit (LSB) is forced to one (i.e. is rounded up) to provide the result. This forcing operation is very fast-much faster than the incrementor operation of the prior art. If the least significant bit of accelerator adder 20 is "one" then step 104 is executed, in which the contents of accelerator adder 21 are selected and the LSB is forced to zero to provide the result. By way of explanation of this final step (104), this is equivalent to correcting the "error" of adding "two" to the accelerator adder, instead of only adding "one". This final step is, as for step 103, very fast.

Instead of looking at the LSB of {carry+sum} in step 102, the procedure could look at the LSB of {carry+sum+2}, which is, of course, the same. If other types of rounding are to be used, further combinations of the above steps can be used to provide the necessary result.

The invention is not limited to multiplication of floating point numbers. The invention is applicable anywhere a floating point number, which may or may not require normalizing, needs to be incremented (or decremented).

A floating point number is deemed to require normalizing if its most significant bit is not "one".

Prior art methods of rounding after multiplication of floating point numbers generally take above sixteen nanoseconds. This time can be substantially reduced in accordance with the present invention.

The invention does not, in fact, call for significant additional hardware because the new accelerator adder 21 occupies approximately the same space as the incrementor of the prior art which is replaced.

The invention may be used in an adder, where the exponent may have to be incremented when the addition has been performed. It may be necessary to increment the exponent by zero, one or two. The exponent is provided in one accelerator adder and the same number incremented by two is provided in the other accelerator adder. Or, when the mantissas have been added, the contents of one or the other accelerator adder can be selected, or, in the case of incrementation by one, the lower value can be selected and its LSB forced up, or the higher value can be selected and its LSB forced down. The result is a faster calculation.

A second aspect of the invention will now be described. When integer multiplication is performed (32×32) the thirty-two least significant bits yield the multiplication result and if the thirty-two most significant bits are not all equal, and equal to the sign, then the multiplication result is incorrect, and there is an overflow. To obtain this information, it is necessary to detect whether the thirty-two most significant bits are all equal and equal to the sign. In the prior art, this represents a time consuming step.

Figure 7:
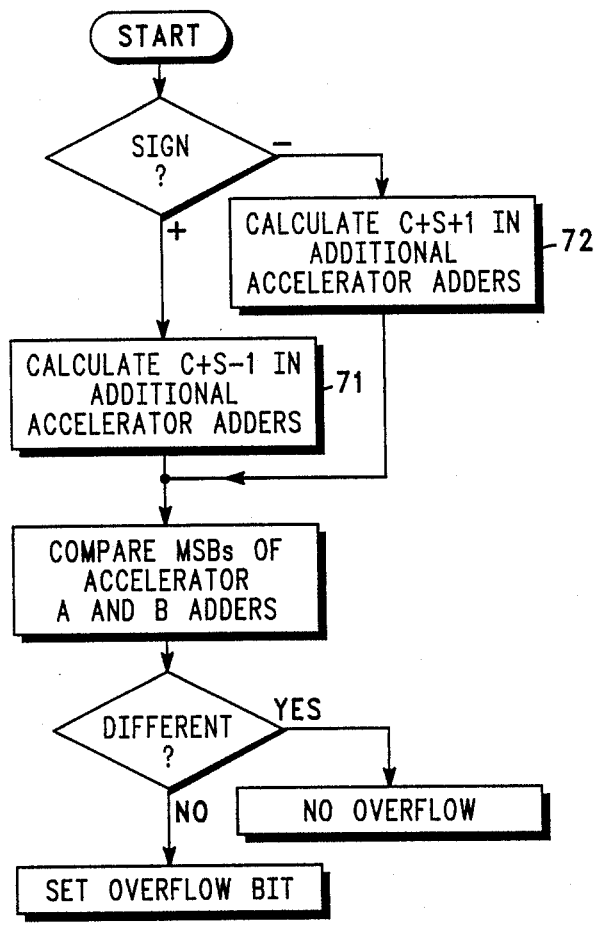
FIG. 7 is a flow chart of a method of integer overflow detection in accordance with a second aspect of the invention.
Figure 6:
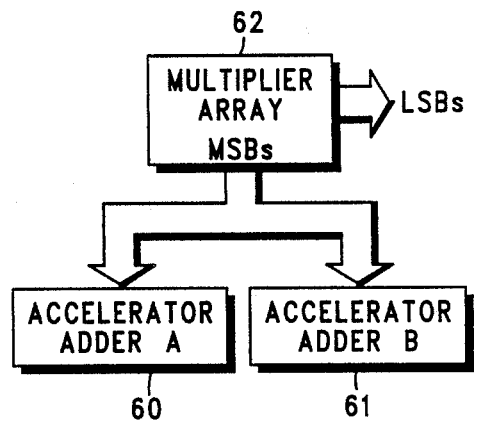
FIG. 6 is an diagram of a integer overflow or zero detector in accordance with a second aspect of the invention.

The present invention provides a solution to this problem, as shown in FIG. 6, where a multiplier array is shown and the thirty-two most significant bits are simultaneously loaded into accelerator adders A and B (60 and 61, respectively). The operation of the apparatus is shown in FIG. 7. First of all, the signs of the operands are compared. If the result of the multiplication is positive, then the value {carry+sum−1} is calculated in accelerator adder 61 (step 71). The value {carry+sum} is in any case calculated in accelerator adder A. In the contrary case, where the result is negative, the value {carry +sum+1} is calculated in the additional accelerator adder 61. The most significant bits of accelerator adders A and B are compared. If these are different, then it is indicative of the fact that the value in accelerator adder 60 is all zeroes, and there is no overflow. If, however, the most significant bits are equal, there must be an overflow.

The above explanation can be further explained by the reverse logic: that if and only if the result of step 71 is all zeroes, then the most significant bit of accelerator adder A must be different from the most significant bit of accelerator adder B.

Figure 8:
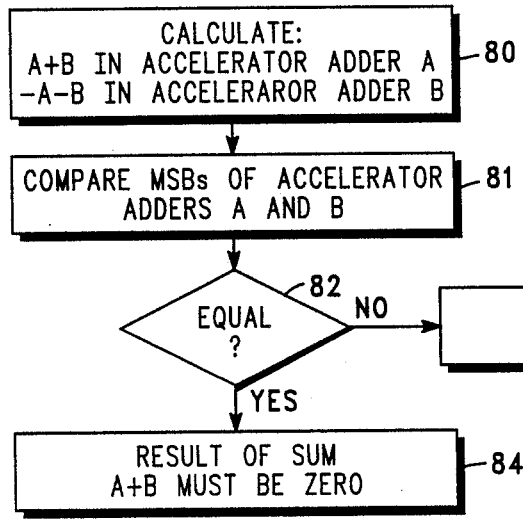
FIG. 8 is a flow chart of a zero detector in accordance with the second aspect of the invention.

Referring to FIG. 8, a further use for two accelerator adders is shown, where it is desired to detect "zero" in an adder. The structure of the circuit used is similar to that of FIG. 6, but the multiplier array 62 is replaced with an adder. The sum (A+B) is passed to accelerator adder A and the sum (−A−B) is passed to accelerator adder B. The MSBs of the two accelerator adders are compared in step 81 of FIG. 8. If these are equal, the result of the sum must be zero. By now it should be apparent that there has been provided a data processor for computing using normalized numbers where an increment step may be necessary on a number, but where that number may or may not have to be normalized, depending on the computation. The invention is particularly useful in rounding after multiplying, as well as in exponent incrementing after adding. The invention is also particularly well adapted for detecting a uniform bit state in a number, e.g. detecting all zeroes, such as for overflow detection in a floating point multiplier.

While there have been described hereinabove the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

I claim:

1. Apparatus for receiving and performing computations with floating point numbers comprising:
   first means for receiving a carry bit operand and a sum bit operand from a multiplication operation and substantially simultaneously computing therefrom a first number and a second number which equals the first number incremented by two;
   second means coupled to the first means for performing a predetermined further computation based upon a predetermined rounding algorithm which determines whether an output of the multiplication operation requires normalizing; and
   third means coupled to the first and second means for selectively outputting as the output of the multiplication operation one of said first and second numbers in accordance with the outcome of the further computation.

2. The apparatus of claim 1, wherein the first number is a mantissa of a floating point number which is a multiplication product of two floating point operands and wherein the predetermined rounding algorithm is one of the following rounding algorithms: truncation, rounding to plus infinity, rounding to minus infinity or rounding to a nearest even.

3. The apparatus of claim 1, wherein the first number is the exponent of a floating point number which is the sum of two floating point operands and wherein the predetermined rounding algorithm is one of the following rounding algorithms: truncation, rounding to plus infinity, rounding to minus infinity or rounding to a nearest even.

4. The apparatus of claim 1 wherein said third means selects one of said numbers and forces a logic state of a least significant bit thereof to an opposite logic state before outputting the selected number as the output of the multiplication operation.

5. A method of computing normalized numbers in a data processor comprising the steps of:
   providing first means for receiving input operands and substantially simultaneously computing therefrom a first number and a second number which equals the first number incremented by two;
   providing second means coupled to the first means for deciding whether the first number requires normalizing in accordance with a predetermined rounding algorithm; and
   providing third means coupled to both the first and second means for either: (1) if the first number is normalized, selecting and outputting one of either the first number with a least significant bit thereof forced to a first logic state or the incremented second number with a least significant bit thereof forced to a second logic state, or (2) if the first number is not normalized, forcing a least significant bit of the second number to a second logic state and outputting the second number in modified form.

6. The method of claim 5 wherein each number outputted represents a product operand.

7. A method of operating a data processor to compute normalized numbers by determining whether an overflow bit is produced in response to an arithmetic computation, comprising the steps of:
   substantially simultaneously computing with arithmetic logic circuitry a first number and a second number differing from the first number by one;
   providing means to compare the most significant bits of the numbers, and
   determining that no overflow of bits of the first number has resulted from the computing by concluding that all the bits of the first number have equal logic states if and only if said most significant bits of the first number are unequal at any bit position with the most significant bits of the second number, and providing an output signal indicative of an overflow bit as a result of said computing step.

* * * * *